(12) United States Patent
Cameron et al.

(10) Patent No.: US 10,286,879 B2
(45) Date of Patent: May 14, 2019

(54) WINDOW WASHER FLUID RESERVOIR CONTOURED TO FIREWALL

(71) Applicant: FORD GLOBAL TECHNOLOGIES, LLC, Dearborn, MI (US)

(72) Inventors: Graeme Cameron, Ivanhoe (AU); Salman Nazir Shami, Doreen (AU)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

(21) Appl. No.: 14/481,096

(22) Filed: Sep. 9, 2014

(65) Prior Publication Data

US 2016/0068140 A1    Mar. 10, 2016

(51) Int. Cl.
*B60S 1/48*    (2006.01)
*B60S 1/50*    (2006.01)

(52) U.S. Cl.
CPC ..................... *B60S 1/50* (2013.01)

(58) Field of Classification Search
CPC ...... B60S 1/50; B60S 3/04; B60S 1/48; B60S 1/46; B60S 1/02; B60K 15/03; B60K 15/03006; B60K 15/03177; B60K 2015/03493; B62D 25/081; B62D 21/16
USPC ................. 220/562, 564; 52/171.2; 510/181; 239/284.1, 373; 15/250.02, 250.01; 417/394
See application file for complete search history.

(56) References Cited

U.S. PATENT DOCUMENTS

| | | | |
|---|---|---|---|
| 2,306,778 A * | 12/1942 | Carney ................ | B60S 1/48 15/250.01 |
| 2,703,127 A * | 3/1955 | Webb .................. | B60S 1/48 383/116 |
| 2,780,491 A * | 2/1957 | Gauthier ............. | B60S 1/48 137/209 |
| 4,893,865 A | 1/1990 | McClain et al. | |
| 5,349,717 A | 9/1994 | Patterson et al. | |
| 6,868,928 B2 | 3/2005 | Cohen et al. | |
| 2001/0003352 A1 | 6/2001 | Ruden et al. | |
| 2004/0142232 A1* | 7/2004 | Risca ................. | B60H 1/00514 429/100 |
| 2006/0244288 A1 | 11/2006 | Sandhu et al. | |
| 2009/0152275 A1* | 6/2009 | Matsumoto ........... | B60S 1/50 220/564 |

FOREIGN PATENT DOCUMENTS

JP    H04331649 A    11/1992

* cited by examiner

Primary Examiner — Fenn C Mathew
Assistant Examiner — Elizabeth J Volz
(74) Attorney, Agent, or Firm — Jason Rogers; Vichit Chea; King & Schickli, PLLC

(57) ABSTRACT

A window washer fluid reservoir is provided for a motor vehicle. The reservoir includes a flattened washer fluid tank having an outer wall contoured to hug a firewall of the vehicle.

17 Claims, 3 Drawing Sheets

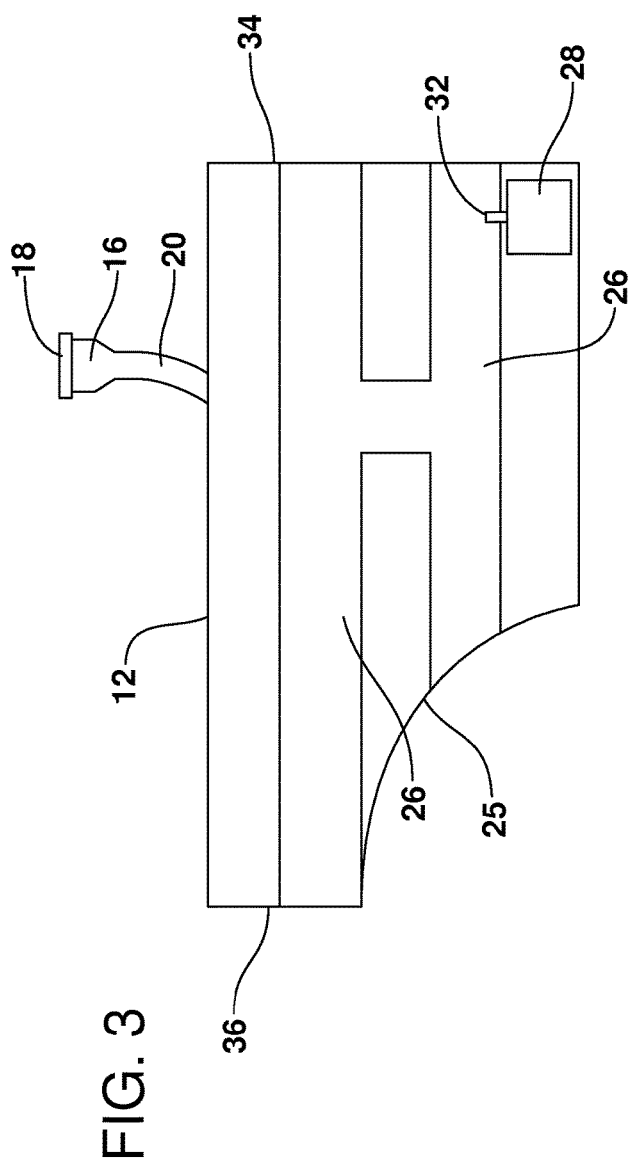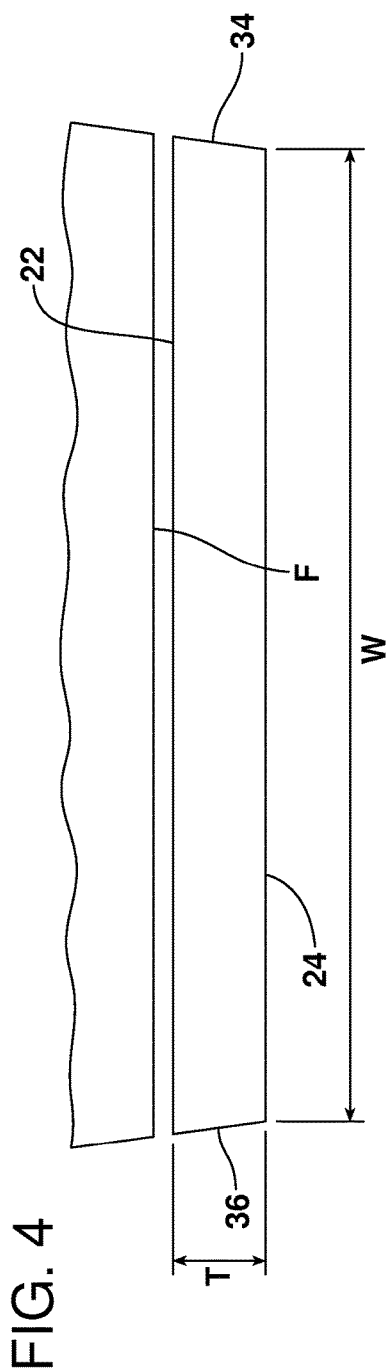

WINDOW WASHER FLUID RESERVOIR CONTOURED TO FIREWALL

TECHNICAL FIELD

This document relates generally to the motor vehicle field and, more particularly, to a window washer fluid reservoir providing various benefits and improved performance.

BACKGROUND

It has long been recognized that there are better places to mount the windshield washer reservoir than under the hood of the vehicle. JP H04-331649 discloses the concept of forming the washer tank in the cowl grille. U.S. Patent Application Publication 2006/0244288 discloses the concept of mounting the windshield washer fluid reservoir under the cowl grille. In both of these devices the windshield washer fluid reservoir may be refilled by removing a cap provided on the cowl grille. Accordingly, the vehicle operator does not need to open the hood in order to replenish the windshield washer fluid in the reservoir.

While this is a significant benefit, these prior devices failed to provide a complete and effective solution as they did not address where to position the windshield washer fluid reservoir to obtain the greatest benefits.

This document relates to a windshield washer fluid reservoir for a motor vehicle that is designed and positioned to maximize all benefits and thereby represents a significant advance in the art.

SUMMARY

In accordance with the purposes and benefits described herein, a windshield washer fluid reservoir is provided for a motor vehicle. The windshield washer fluid reservoir comprises a washer fluid tank including an outer wall contoured to hug a firewall of a vehicle. The reservoir further includes an inlet provided in a cowling panel of the vehicle and a transfer tube connecting that inlet to the washer fluid tank. Further, in one embodiment the reservoir further includes an interior baffle in the washer fluid tank to control and limit the sloshing of fluid in the tank as the vehicle is operated.

More specifically, a rear face of the washer fluid tank is secured to the vehicle juxtaposed to the firewall. In one embodiment the washer fluid tank has a total fore-aft dimension between the rear face and an opposing front face of between 50-100 mm. In one embodiment the rear face of the washer fluid tank engages the firewall.

In one possible embodiment the washer fluid tank has a front face, a rear face, and left side face, a right side face, a thickness T from the front face to the rear face and a width W from the right side face to the left side face wherein of ratio T to W is between 1 to 7 and 1 to 9. In one possible embodiment that ratio is about 1 to 8. In one possible embodiment the rear face of the outer wall is contoured to hug the firewall of the vehicle. In another possible embodiment the front and rear faces of the outer wall are contoured to hug the firewall of the vehicle. In yet another possible embodiment the washer fluid tank nests against the firewall of the vehicle.

In accordance with an additional aspect, a method is provided of improving the performance of a windshield washer system. That method comprises the steps of forming a washer fluid tank in a flattened shape and having a contour matching a firewall of a vehicle and mounting the washer fluid tank against the firewall so that the washer fluid tank hugs the firewall. Still further the method may include providing the washer fluid tank with a maximum thickness T of 100 mm and a minimum volume V of 9 liters. In another possible embodiment the method includes providing the washer fluid tank with a maximum thickness T of 75 mm and a minimum volume V of 6.8 liters. In yet another embodiment the method includes providing the washer fluid tank with a maximum thickness T of 50 mm and a minimum volume V of 4.5 liters.

In the following description, there are shown and described several preferred embodiments of the window washer fluid reservoir. As it should be realized, the window washer fluid reservoir is capable of other, different embodiments and its several details are capable of modification in various, obvious aspects all without departing from the window washer fluid reservoir as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the window washer fluid reservoir and together with the description serve to explain certain principles thereof. In the drawings:

FIG. 3 is a schematical front elevational view illustrating the window washer fluid reservoir including the transmission tunnel clearance contour.

FIG. 4 is a schematical cross-sectional view of the window washer fluid reservoir.

Reference will now be made in detail to the present preferred embodiment of the window washer fluid reservoir, examples of which are illustrated in the accompanying drawings.

DETAILED DESCRIPTION

Figure 1:
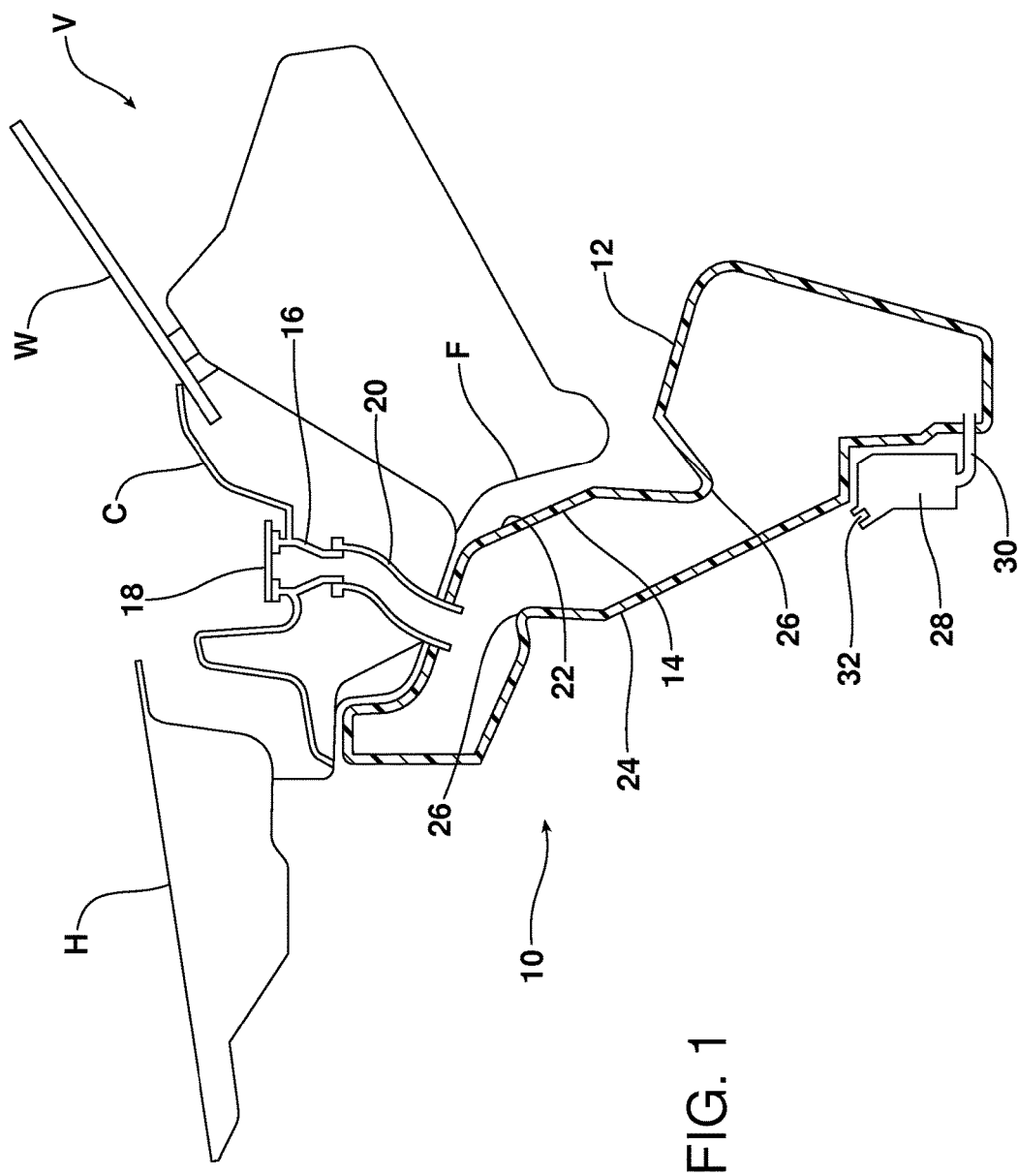
FIG. 1 is a schematical cross-section view of the window washer fluid reservoir contoured to hug and nest against a firewall of a vehicle.
Figure 2:
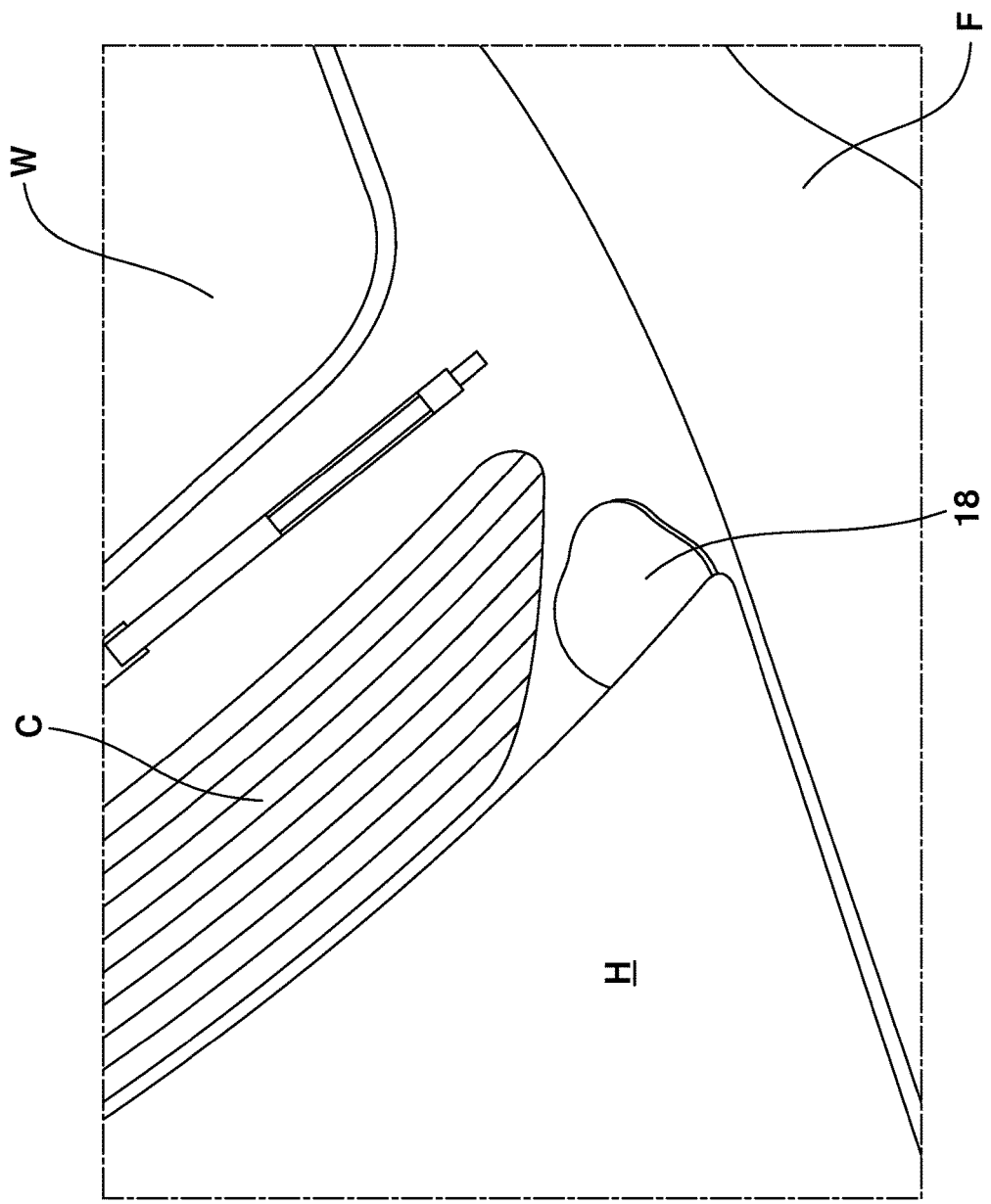
FIG. 2 is a schematical perspective view from above illustrating a removable cap provided along the cowling of a vehicle for refilling the window washer fluid reservoir.

Reference is now made to FIGS. 1, 3 and 4 which schematically illustrate the window washer fluid reservoir 10. As illustrated, the window washer fluid reservoir 10 includes a washer fluid tank 12 including an outer wall 14 contoured to hug a firewall F of a motor vehicle V to which the windshield washer fluid reservoir is mounted. As illustrated in FIG. 2, the washer fluid reservoir 10 includes an inlet 16 provided in the cowling C of the vehicle above the fender panel F and between the windshield W and engine compartment hood H. A removable cap 18 seals the inlet 16 when in the closed position illustrated in FIG. 1. A transfer tube 20 connects the inlet 16 in fluid communication with the interior of the washer fluid tank 12.

The tank 12 may be blow molded from appropriate materials such as polypropylene with a rear face 22 contoured to hug the firewall F. Further, as illustrated in FIG. 3, the outer wall 14 may also include a transmission tunnel clearance contour 25 to accommodate and provide clearance for the engine transmission E. In the embodiment illustrated in FIG. 1, the front face 24 also includes a similar contour. Integral baffles 26 are molded into the tank 12 to limit and control sloshing of windshield washer fluid in the tank 12 as the vehicle is operated. One or more pumps 28 may be mounted to the washer fluid reservoir 10 to pump washer fluid from the tank 12 through the inlet 30 and force that washer fluid through the discharge outlet 32 to washer fluid nozzles (not shown) to spray the windshield, rear window and/or headlights of the vehicle.

As should be appreciated, the washer fluid tank 12 has a flattened shape. In one possible embodiment the total fore-aft dimension between the front face 24 and rear face 22 is between 50-100 mm and an approximate volume ranging between 4.5 and 9 liters.

As schematically illustrated in FIG. 4, the washer fluid tank 10 has a front face 24, a rear face 22, a left side face 34, a right side face 36, a thickness T from the front face to the rear face and a width W from the right side face to the left side face wherein the ratio of T to W is between 1 to 7 and 1 to 9. In one particularly useful embodiment that ratio is 1 to 8.

In any of the embodiments it should be appreciated that the washer fluid tank 12 is formed in a flattened shape and having a contour matching a firewall F of the vehicle V. The tank 12 is then mounted juxtaposed or against the firewall F so that the tank hugs the firewall. In one possible embodiment the washer fluid tank 12 is provided with a maximum thickness of 100 mm and a minimum volume of 9 liters. In another possible embodiment the washer fluid tank 12 is provided with a maximum thickness of 75 mm and minimum volume of 6.8 liters. In yet another possible embodiment the washer fluid tank is provided with a maximum thickness 50 mm and a minimum volume of 4.5 liters. In any embodiment, the washer fluid reservoir tank 12 may have a ratio of maximum thickness T in millimeters to minimum volume V in milliliters of between 1 to 80 and 1 to 100. In one particularly useful embodiment, that ratio is about 1 to 90.

A number of benefits are provided by the washer fluid reservoir 10. Advantageously, by providing the inlet 16 in the cowling C, the washer fluid reservoir 10 may be easily refilled. In fact it is not even necessary to open the hood H. By providing the washer fluid tank 12 with a relatively flat shape it is both much wider and much deeper than it is thick in a fore-aft direction. Because of its flattened shape, it is possible to provide a washer fluid tank of substantial volume and far greater capacity than washer fluid reservoirs generally equipped on vehicles today. This better ensures that washer fluid is available to the vehicle operator when needed to clean a windshield, a rear window and/or headlights under substantially any operating conditions. Significantly, it should be appreciated that the weight of this increased volume of washer fluid is also carried rearward of the front wheels toward the middle of the vehicle for better weight distribution.

Significantly, excess heat from the engine helps keep the windshield washer fluid warm in cold weather conditions. Further, by positioning along the firewall adjacent the cowling, the lines from the pump to the windshield washer spray jets are much shorter than a situation where the windshield washer fluid reservoir is mounted under the hood toward the front of the vehicle by the headlamps as is common today.

In addition to these benefits, it should be appreciated that the washer fluid reservoir 10 may extend across a significant portion of the firewall on the left hand side of right hand drive vehicles and on the right hand side of left hand drive vehicles between the engine and the firewall where the tank and the washer fluid contained therein may provide noise suppression and vibration benefits to further enhance the performance of the vehicle and the satisfaction of the vehicle owner.

The foregoing has been presented for purposes of illustration and description. It is not intended to be exhaustive or to limit the embodiments of the washer fluid reservoir 10 to the precise form disclosed. Obvious modifications and variations are possible in light of the above teachings. For example, the rear wall 22 of the washer fluid tank 12 could actually be molded with a contour that will fully nest with the firewall F if desired. Fewer or more baffles 26 or the position and direction of the baffles could be changed. Further the washer fluid tank 12 could be blow molded or made by some other process with some other materials. All such modifications and variations are within the scope of the appended claims when interpreted in accordance with the breadth to which they are fairly, legally and equitably entitled.

What is claimed:

1. A window washer fluid reservoir for a motor vehicle, comprising:
   a washer fluid tank having a flattened shape, said washer fluid tank including an outer wall contoured to hug a firewall of the vehicle;
   an inlet provided in a cowling panel of the vehicle, wherein said inlet is configured to allow the washer fluid tank to be refilled with windshield washer fluid; and
   a transfer tube directly connecting said inlet to said washer fluid tank.

2. The reservoir of claim 1, further including an interior baffle in said washer fluid tank.

3. The reservoir of claim 2, wherein a rear face of said washer fluid tank is secured to said vehicle juxtaposed to the firewall.

4. The reservoir of claim 3, wherein said washer fluid tank has a total for-aft dimension between said rear face and an opposing front face of between 50-100 mm.

5. The reservoir of claim 4, wherein said rear face of said washer fluid tank engages the firewall.

6. The reservoir of claim 1, wherein said washer fluid tank has a front face, a rear face, a left side face, a right side face, a thickness T from said front face to said rear face and a width W from said right side face to said left side face wherein a ratio of T to W is between 1 to 7 and 1 to 9.

7. The reservoir of claim 1, wherein said washer fluid tank has a front face, a rear face, a left side face, a right side face, a thickness T from said front face to said rear face and a width W from said right side face to said left side face wherein a ratio of T to W is about 1 to 8.

8. The reservoir of claim 1, wherein said rear face of said outer wall is contoured to hug said firewall of the vehicle.

9. The reservoir of claim 1, wherein said front and rear faces of said outer wall are contoured to hug said firewall of the vehicle.

10. The reservoir of claim 1, wherein said washer fluid tank nests against said firewall of said vehicle.

11. The reservoir of claim 1, wherein said washer fluid tank has a ratio of maximum thickness T in millimeters to minimum volume V in milliliters of between 1 to 80 and 1 to 100.

12. The reservoir of claim 1, wherein said washer fluid tank has a ratio of maximum thickness T in millimeters to minimum volume V in milliliters of about 1 to 90.

13. The reservoir of claim 1, wherein said washer fluid tank further includes a transmission tunnel clearance contour in said outer wall.

14. A vehicle incorporating the window washer fluid reservoir of claim 1, wherein said reservoir includes said washer fluid tank including said outer wall contoured to hug said firewall of the vehicle.

15. The reservoir of claim 1, further including a removable cap sealing the inlet in a closed position.

16. The reservoir of 1, further including a discharge outlet fluidly connected to the washer fluid tank.

17. The reservoir of claim 16, further including a pump mounted to the washer fluid tank to force washer fluid through the discharge outlet to spray the windshield of the vehicle.

\* \* \* \* \*